(No Model.)
W. W. HOLMES.
SHOP SAW.
No. 525,211. Patented Aug. 28, 1894.
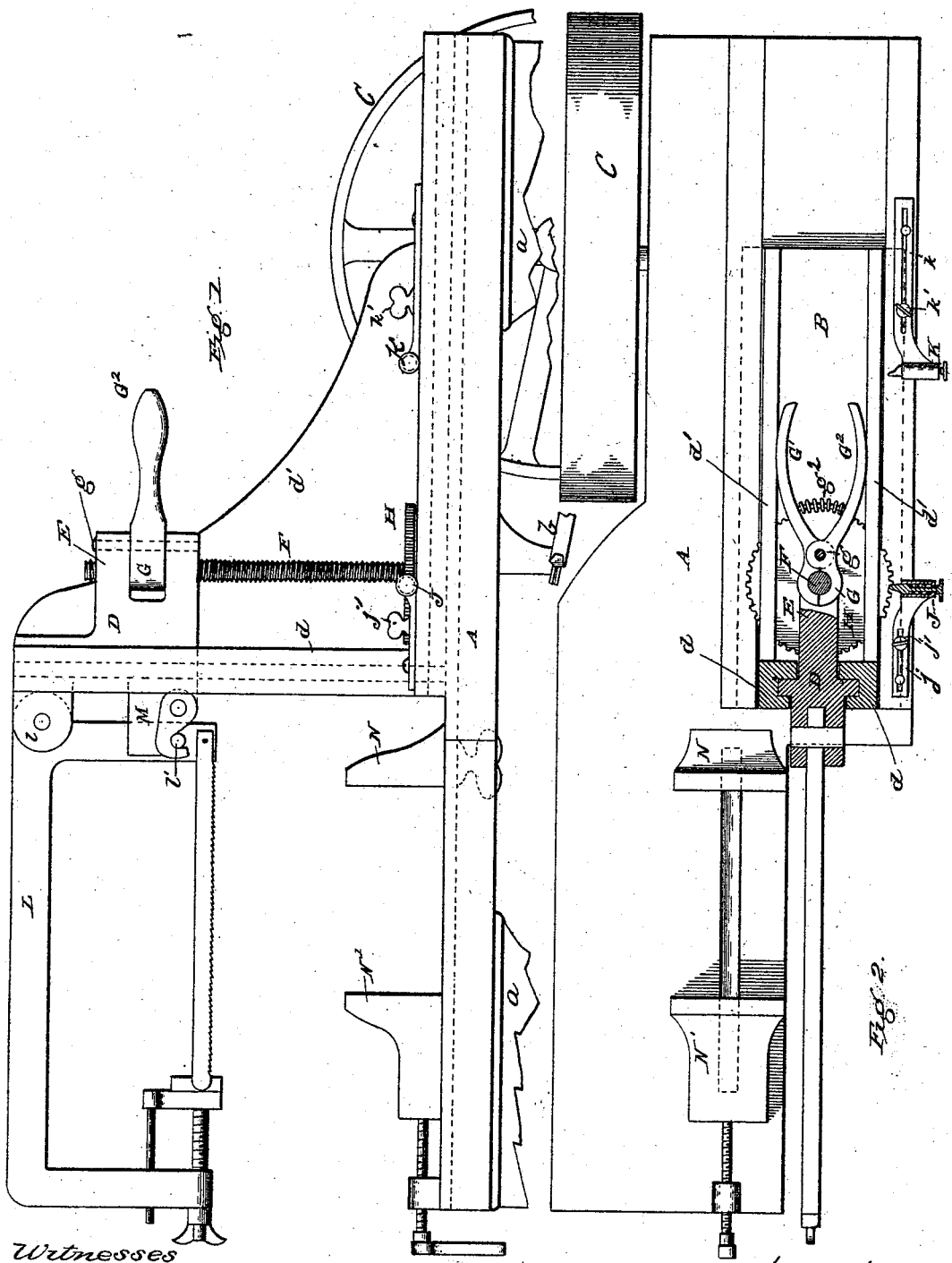
Witnesses
Harry S. Rohrer
Herbert Bradley
Inventor
William W. Holmes
By F. W. Ritter Jr.
Atty.

UNITED STATES PATENT OFFICE.

WILLIAM W. HOLMES, OF CHICAGO, ILLINOIS, ASSIGNOR TO C. F. QUINCY, OF SAME PLACE.

SHOP-SAW.

SPECIFICATION forming part of Letters Patent No. 525,211, dated August 28, 1894.

Application filed May 24, 1894. Serial No. 512,370. (No model.)

*To all whom it may concern:*

Be it known that I, WILLIAM W. HOLMES, a citizen of the United States, residing at Chicago, in the county of Cook, State of Illinois, have invented certain new and useful Improvements in Shop-Saws; and I hereby declare the following to be a full, clear, and exact description of the same, reference being had to the accompanying drawings, in which—

Figure 1, is a side elevation of a power driven hack-saw embodying my invention—one of the side brackets removed to show the automatic feed mechanism; and Fig. 2, is a plan view, partly in section, to show the connection of the saw frame with the carriage.

Like symbols refer to like parts wherever they occur.

My invention relates generally to shop saws, but more especially to what are known as "hack saws" for cutting rods, bars, tubes, or other metallic articles in the course of manufacture, and has for its objects the production of a simple, efficient, and durable, positive feed, and a uniform speed, power driven hack-saw for shop use.

The first feature of my invention embraces the combination with horizontally reciprocating carriage ways, of a vertically movable saw carriage and automatic feed mechanism for said carriage, whereby the carriage is alternately raised and lowered in a horizontal plane to prevent the dragging of the saw on the stock, and insure a constant and definite feed.

A second feature embraces the combination with horizontally reciprocating carriage ways, of a vertically movable carriage mounted thereon, a feed mechanism for the carriage, and a hack-saw secured to and horizontally projecting from said carriage.

A third feature of my invention, embraces the combination with a power driven hack-saw of a saw-carriage and its feed screw, together with mechanism for alternately reversing the feed screw, and a vise adjustable with relation to the saw, whereby the entire length of the saw blade can be utilized on small work.

A fourth feature of my invention, embraces a swinging or pivotal connection between the hack-saw and its power driven automatically fed carriage, whereby the hack-saw may be turned out of the way for inserting, removing, or adjusting the stock or material operated upon.

There are other, minor features of invention, involving special combinations, and particular details of construction—all as will hereinafter more fully appear.

I will now proceed to describe my invention more fully so that others skilled in the art to which it appertains may apply the same.

In the drawings, A indicates a table or base for the support of the operative mechanism, said base elevated upon legs or supports $a\ a$, and provided with a reciprocating slide B which may be dovetailed into base A or travel in ways or guides thereon. The slide B receives its motion through a pitman or link $b$ from a crank on the belt pulley C—or by means of any other suitable and known mechanism for such purpose.

Erected on the slide B at its forward end are the vertical ways or guides $d\ d$ for the saw carriage D, and if desired the ways or guides may be braced from the slide B by the side brackets $d'$ which will partially box and protect the automatic feed mechanism of the carriage D.

Projecting rearwardly from the carriage D is a vertically perforated and horizontally slotted lug E, through which passes the feed screw F (in the present instance a left hand screw to agree with the location of the dogs or pawls J, K, hereinafter referred to)—and said screw F arranged parallel with the ways $d\ d$ or with the travel of the carriage D, and within the horizontal slot of projection E and encircling the feed screw F is the feed nut G properly secured to the projection E of carriage D so that the carriage shall travel up or down responsive to and proportionate with the movement of the feed screw.

The feed nut G is preferably a split or divisible nut, composed of two vertical sections pivoted on the lug E as at $g$ and terminating in handles $G'\ G^2$ similar to a pair of pliers, with spring $g^2$ or equivalent means of maintaining the sections of the nut in operative contact with each other and with the feed screw F.

Secured to the lower end of feed screw F is a ratchet wheel H preferably of such diameter as to project beyond the edges of the slide B, and said ratchet wheel is arranged so as to engage alternately with one of two spring pawls or dogs J—K arranged on the base A—or equivalent support—near the opposite ends of the travel or path of slide B.

The spring pawls or dogs J and K are preferably mounted on slotted plates j and k controlled by set or thumb screws j' and k' so that the said dogs can be adjusted nearer together or farther apart to control or regulate the length of cutting stroke of the saw, and the extent and portion of the saw blade brought into use during any given operation of the saw. These spring pawls or dogs J, K are so constructed and arranged as to reversely actuate the ratchet wheel H and feed screw F alternately, but the movement imparted to the feed screw by the forward pawl J which lifts the saw-frame D is only half the extent of the reverse movement which is imparted to said feed screw by rear dog K, which draws the carriage D downward preparatory to the cutting stroke of the saw.

The frame L of the hack-saw, is pivotally connected to the carriage D as at l so that the saw may be turned out of the way to remove or adjust the work—or for any other purpose desired, and said frame is provided with a pin or pins l' with which a spring catch M on the carriage D engages to lock the frame L in its horizontal or operative position.

N N' indicate the two jaws of a vise for holding the stock or material to be operated on—and both of said jaws are longitudinally adjustable on the table (by a slot and set screw or otherwise) parallel with the travel of the saw so that a proper adjustment of the vise with relation to the saw, and a proper adjustment of the feed dogs J and K—all of which will be perfectly apparent to the skilled mechanic, any sized stock within the capacity of the machine may be operated upon, and any part of the saw-blade made to do the work, while in case of small stock, the whole or any part of the saw-blade may be utilized exactly as in hand sawing.

The construction of the devices being substantially such as hereinbefore specified—the operation thereof will be as follows: The vise having been adjusted to the desired position and the dogs J and K adjusted to obtain the length of cutting stroke required, the material or stock to be operated upon is secured in the vise, and the saw frame L brought forward into its horizontal, operative position, where it is rigidly held by the catch M. The split feed nut G is then opened and the carriage lowered until the saw is in position to make its first cut, whereupon, motion being imparted to the slide B, during the first forward motion thereof the saw will adjust itself to the stock or material, and near the end of said stroke the ratchet wheel will be operated by the pawl or dog J so that the carriage will be lifted sufficiently to free the saw from the stock or material on the return or backward movement thereof. Near the close of the backward movement or idle stroke of the saw the pawl or dog K will reversely operate the ratchet wheel and through feed screw F draw the carriage D down through twice the extent of its former upward movement, and these operations of the feed mechanism are repeated with each backward and forward or cutting movement of the saw, so that each forward movement of the saw is made in a horizontal plane with uniform feed, and speed, without regard to size of stock, and each backward or idle movement of the saw is made in a higher horizontal plane which clears it from the stock or material operated upon, and prevents the dragging and rapid wear and destruction of the saw.

Having thus described my invention, what I claim, and desire to secure by Letters Patent, is—

1. The combination with a hack-saw, of a vertically movable carriage therefor, horizontally reciprocating ways for said carriage, and an automatic feed mechanism for actuating the carriage, substantially as and for the purposes specified.

2. The combination with horizontally reciprocating carriage guides or ways, of a vertically movable saw carriage arranged thereon, an automatic feed mechanism for said carriage, and a horizontally arranged hack-saw secured to and projecting from said carriage, substantially as and for the purposes specified.

3. The combination with a horizontally arranged hack-saw and its carriage, of alternately reverse acting feed mechanism for lifting the carriage at or near the close of the cutting stroke, substantially as and for the purposes specified.

4. In a power hack-saw, the combination with a suitable base, of a reciprocating slide, carriage ways erected thereon, a carriage, a feed screw for the carriage, and mechanism for alternately reversing the feed screw; substantially as and for the purposes specified.

5. In a power hack-saw, the combination with a suitable base, of a reciprocating slide, a saw carriage and feed screw mounted on the slide, a ratchet wheel for the feed screw, and spring pawls or dogs arranged on the base or slide support and adapted to alternately reverse the feed screw; substantially as and for the purposes specified.

6. In a power hack-saw, the combination with a suitable base or slide support, of a reciprocating slide mounted thereon, a saw carriage and feed screw mounted on the slide, a ratchet wheel for actuating the feed screw, and adjustable dogs or pawls for engaging the ratchet wheel at the opposite ends of the travel of the reciprocating slide; substantially as and for the purposes specified.

7. In a power hack-saw, the combination with a saw carriage and its feed mechanism, of adjustable mechanism for reversing the feed and changing the length of the working stroke of the saw, and an adjustable vise for holding the work; substantially as and for the purposes specified.

8. In a power hack-saw, the combination with a power driven saw carriage, of a saw frame pivoted thereto, and means for locking the saw frame to the carriage; substantially as and for the purposes specified.

9. In power driving mechanism for shop-saws, the combination of a reciprocating slide, vertical ways arranged thereon, a saw carriage mounted on said ways, a feed screw mounted on the slide and provided with a ratchet wheel, and dogs or pawls adjustably mounted in the path of the reciprocating slide and arranged to engage the ratchet wheel of the feed screw at or near the opposite ends of the travel of the reciprocating slide; substantially as and for the purposes specified.

In testimony whereof I affix my signature, in presence of two witnesses, this 2d day of May, 1894.

WILLIAM W. HOLMES.

Witnesses:
GEO. A. POWELL,
S. F. JOHNSON.